(12) United States Patent
Kaufmann et al.

(10) Patent No.: US 12,157,423 B2
(45) Date of Patent: Dec. 3, 2024

(54) DEVICE FOR POWER SUPPLY, METHOD FOR SUPPLYING POWER TO AT LEAST ONE ELECTRICAL LOAD, AND VEHICLE

(71) Applicant: Knorr-Bremse Systeme Fuer Nutzfahrzeuge GmbH, Munich (DE)

(72) Inventors: Christian Kaufmann, Sindelfingen (DE); Alexander Matt, Bruchsal (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 18/040,925

(22) PCT Filed: Aug. 13, 2021

(86) PCT No.: PCT/EP2021/072605
§ 371 (c)(1),
(2) Date: Feb. 7, 2023

(87) PCT Pub. No.: WO2022/043098
PCT Pub. Date: Mar. 3, 2022

(65) Prior Publication Data
US 2023/0294622 A1 Sep. 21, 2023

(30) Foreign Application Priority Data
Aug. 28, 2020 (DE) ..................... 10 2020 122 507.5

(51) Int. Cl.
*B60L 1/00* (2006.01)
*B60R 16/023* (2006.01)
(Continued)

(52) U.S. Cl.
CPC ........ *B60R 16/0232* (2013.01); *B60R 16/033* (2013.01); *H02H 7/18* (2013.01)

(58) Field of Classification Search
CPC .... B60R 16/0232; B60R 16/033; H02H 7/18; H02J 7/1423; H02J 2310/46; H02J 7/0031;
(Continued)

(56) References Cited

U.S. PATENT DOCUMENTS

2014/0285003 A1* 9/2014 Mueller ................. B60L 58/19
307/10.1
2014/0368041 A1 12/2014 Tu et al.
(Continued)

FOREIGN PATENT DOCUMENTS

DE 10 2016 220 557 A1 4/2018

OTHER PUBLICATIONS

International Search Report for PCT/EP2021/072605, Issued Nov. 26, 2021.

*Primary Examiner* — Rexford N Barnie
*Assistant Examiner* — Xuan Ly
(74) *Attorney, Agent, or Firm* — NORTON ROSE FULBRIGHT US LLP; Gerard A. Messina

(57) ABSTRACT

A device for power supply for a vehicle, including: a first battery; a second battery; a fault-detecting apparatus for detecting a faulty state of the batteries; and a switching apparatus having four battery interfaces and a load interface for connecting at least one electrical load to the device. The first battery interface is connected to a first terminal of the first battery, the second battery interface is connected to a second terminal of the first battery, the third battery interface is connected to a first terminal of the second battery, and the fourth battery interface is connected to a second terminal of the second battery. In a normal state, the switching apparatus connects the second battery interface to the third interface, and in an emergency state, the switching apparatus disconnects the second battery interface from the third interface
(Continued)

and connects the second or fourth battery interface to the load interface.

8 Claims, 1 Drawing Sheet

(51) Int. Cl.
*B60R 16/033* (2006.01)
*H02H 7/18* (2006.01)
*H02J 7/00* (2006.01)

(58) Field of Classification Search
CPC ........... H02J 7/0024; H02J 7/00; Y02T 10/70; B60L 3/0046; B60L 58/18; B60L 1/00
USPC ....................................................... 307/10.1
See application file for complete search history.

(56) References Cited

U.S. PATENT DOCUMENTS

2020/0153050 A1    5/2020  Winger et al.
2020/0185936 A1*   6/2020  Oishi .................... H02J 7/0024

* cited by examiner

DEVICE FOR POWER SUPPLY, METHOD FOR SUPPLYING POWER TO AT LEAST ONE ELECTRICAL LOAD, AND VEHICLE

FIELD OF THE INVENTION

The present invention relates to a device for supplying power for a vehicle, to a method for supplying power to at least one electrical load of a vehicle, and to a vehicle.

BACKGROUND INFORMATION

For redundant power supply of a vehicle electrical system of a vehicle, an additional battery can be planned for, or in the case of an E-truck the voltage can be generated from different cells by a DC/DC converter.

SUMMARY OF THE INVENTION

Against this background, an object of the present approach is to create an improved device, an improved method for supplying at least one electrical load and an improved vehicle.

This object may be achieved by a device, a method for supplying at least one electrical load and a vehicle according to the main claims.

The advantages achievable with the approach presented are that a series circuit of two batteries, frequently already installed in a vehicle, can be used for securing the power supply to a vehicle electrical system of the vehicle.

A corresponding device for a vehicle has the following features to this end:

a first battery and a second battery;

a fault detecting unit configured to detect a faulty state of at least one of the batteries and to provide a fault signal indicating the faulty state; and a switching unit having a first battery interface, a second battery interface, a third battery interface, a fourth battery interface and a load interface for connecting at least one electrical load to the device, wherein the first battery interface is connected to a first pole of the first battery, the second battery interface is connected to a second pole of the first battery, the third battery interface is connected to a first pole of the second battery and the fourth battery interface is connected to a second pole of the second battery, and wherein the switching unit is configured to disconnect the second battery interface from the load interface, to connect the second battery interface to the third battery interface and to connect the fourth battery interface to the load interface in a normal state, and wherein the switching unit is configured to disconnect the second battery interface from the third battery interface in an emergency state and, depending on the fault signal, either to connect the second battery interface to the load interface or to connect the fourth battery interface to the load interface.

The vehicle can be a vehicle for conveying persons or a truck. The device can be a vehicle electrical system of the vehicle or a part of such a vehicle electrical system. The electrical load can be, for example, a control device, a sensor or an electric motor of the vehicle. The batteries can be used to provide the electrical power necessary for operating the at least one electrical load. At least one load can be configured to be operated both at a normal voltage and at a reduced emergency voltage. The normal voltage can be twice as large as the emergency voltage. The normal state can represent a state of the device in which a battery unit comprising the batteries is free of faults. In the normal state, the two batteries can be connected in series and provide the normal voltage in this manner. Such a series connection is frequently found in trucks for example. The emergency state can represent a state of the device in which the battery unit has a fault. For example, the first battery or the second battery can be faulty. In the emergency state, only one of the two batteries can be used for supplying the electrical load. In this manner, only the lower, emergency voltage can be provided. The switching unit can comprise a plurality of electrical switches, in the form of power transistors for example. The switching unit can be configured to connect electrical lines of the device in the normal state in such a manner that the at least one electrical load is supplied with electrical power by a series circuit of the two batteries. The switching unit can be configured, on the other hand, to disconnect the series circuit of the two batteries in the emergency state and to supply the at least one electrical load with electrical power either exclusively by the first battery or exclusively by the second battery. The fault detecting unit can comprise a sensor for capturing the faulty state of at least one of the batteries or can be coupled to such a sensor.

The switching unit can be configured accordingly in order to assume the emergency state if the fault signal indicates the faulty state. This can be independent of which of the batteries is faulty.

The switching unit can be configured to connect the second battery interface to the load interface in the emergency state and to disconnect the fourth battery interface from the load interface if the fault signal indicates a faulty state of the second battery. In this manner, the first battery, possibly still intact, can advantageously continue to be used to supply power to the at least one electrical load.

Accordingly, the switching unit can be configured to connect the fourth battery interface to the load interface in the emergency state and to disconnect the second battery interface from the load interface if the fault signal indicates a faulty state of the first battery. In this manner, the second battery, possibly still intact, can advantageously continue to be used to supply power to the at least one electrical load.

The first battery and the second battery can be of the same type. The two batteries can have the same rated voltage; for example each of the batteries can have a rated voltage of 12 V. In this manner, batteries typically installed in vehicles can be used.

The device can have a generator that is configured to adapt its charging voltage in the emergency state to that of a 12 V battery and to charge only a fault-free one of the batteries. Thus the charging voltage of the generator is no longer in the 24 V range in emergency operation and only the fault-free battery is charged. This means that the reference potential must be applied to the fault-free battery.

The degraded charging voltage of 12 V should be ensured by adjusting the exciter current, using two charging regulators or using two alternators.

The device can additionally have a charging regulator that is configured to provide the control signal by using a reference potential. This can be a charging regulator as known in the vehicle field. The reference potential is dependent on the state of the batteries.

According to one embodiment, the switching unit can have a potential terminal connected to the second pole of the first battery to provide the reference potential, and a generator terminal for receiving the charging signal.

According to an alternative embodiment, two independent charging regulators or two alternators are used. For example, an alternator having two pole pairs can be used in order to charge the batteries in a galvanically isolated manner. That is advantageous for the configuration of the semiconductors in the rectifier, for example, because the reverse voltage can be kept low and high-volume 12 V technology can be used. In this manner as well, the batteries can be recharged sufficiently independently by the alternator(s).

The device can advantageously be used in a vehicle. A corresponding vehicle has, in addition to the aforementioned device, at least one electrical load that is connected to the load interface of the device.

The electrical load here can be configured as a control device for a safety-critical electrical load. For example, the control device can be configured as a control device for a brake system and/or as a control device for automated control of the vehicle and/or as a starter for the engine. In this manner, loads necessary for safe operation of the vehicle can advantageously be supplied with electrical power reliably even if a fault state appears in the area of the batteries.

The vehicle can have an engine that is mechanically coupled to a generator of the device. This can be an engine for powering the vehicle.

A corresponding method for supplying at least one electrical load of a vehicle with electrical power, wherein the method comprises the following steps:

disconnecting a second pole of a first battery from a load interface to the electrical load and connecting the second pole of the first battery to a first pole of a second battery and connecting a second pole of the second battery to the load interface in response to a fault-free state of the first battery and the second battery;

disconnecting the second pole of the first battery from the first pole of the second battery and connecting the second pole of the first battery to the load interface in response to a faulty state of the second battery, or connecting the second pole of the second battery to the load interface in response to a faulty state of the first battery.

The steps of the method can be implemented for example by using a switching unit as mentioned above.

Exemplary embodiments of the approach presented here will be explained in detail in the description below with reference to the figures.

In the description below of favorable exemplary embodiments of the present approach, identical or similar reference signs are used for elements that are shown in the various figures and function similarly, forgoing a repeated description of these elements.

DETAILED DESCRIPTION

Figure 1:
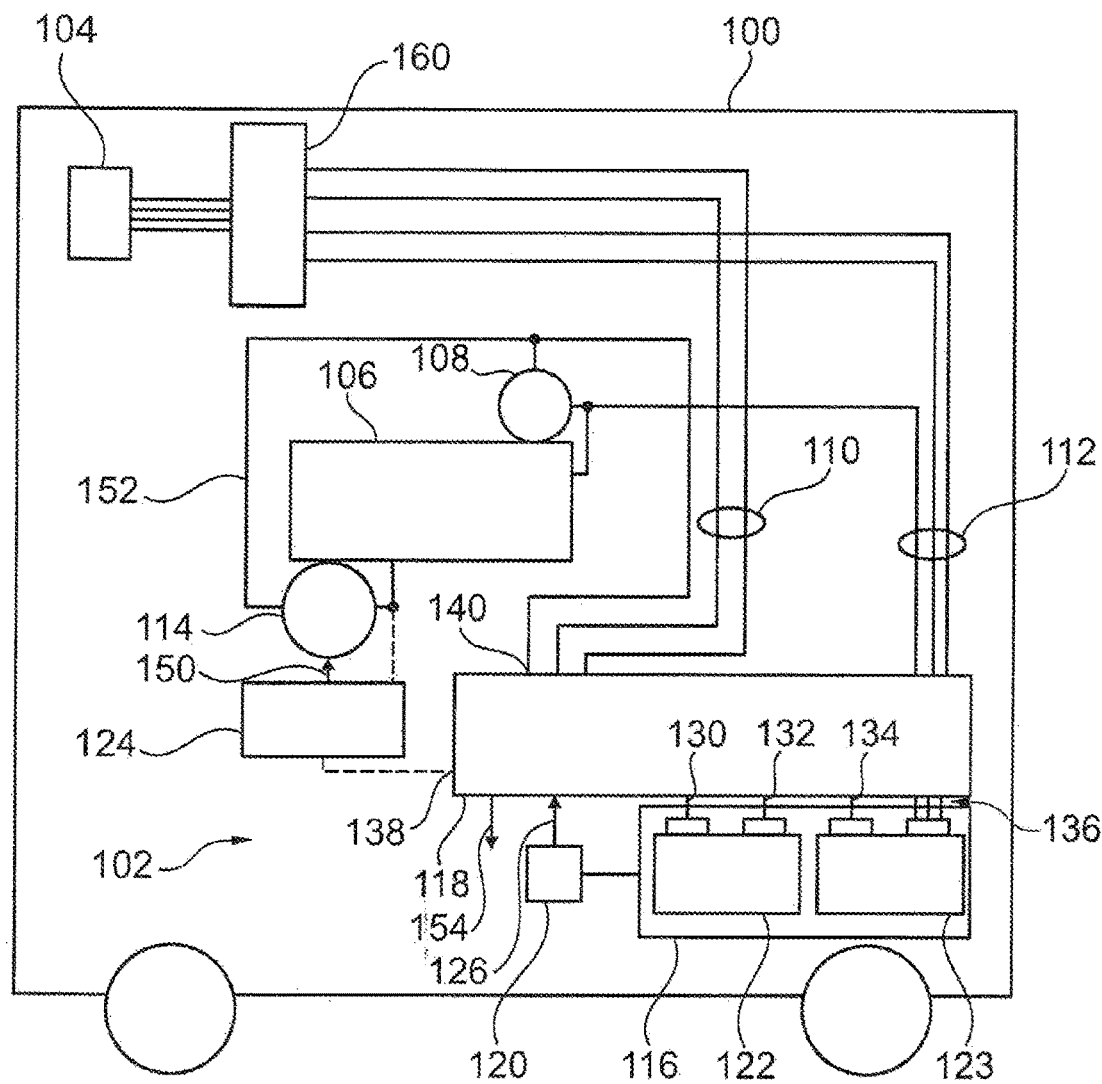
FIG. 1 shows a schematic representation of a vehicle having a device according to an exemplary embodiment.

FIG. 1 shows a schematic representation of a vehicle 100 having a device 102 according to one exemplary embodiment. Merely by way of example, the vehicle 100 is a truck. The vehicle 100 has at least one electrical load 104, typically a plurality of electrical loads. For example, the electrical load 104 is a control device for a brake system of the vehicle 100 or a control device for controlling a functionality of the vehicle 100. Such a control device can also be a control device for automated control of the vehicle 100 for example. The vehicle 100 additionally has an engine 106. For example, the engine 106 is configured as a drive engine for moving the vehicle 100. For example, it is an internal combustion engine. In this case, the vehicle has a further electrical load 108 in the form of a starter for starting the engine 106. The electrical loads 104, 108 require electrical power for their operation. This electrical power is provided by the device 102 via at least one load interface, according to the present exemplary embodiment via a first load interface 110 and a second load interface 112.

The device 102 according to this exemplary embodiment comprises a generator 114, a battery unit 116, a switching unit 118 and a fault detecting unit 120. The switching unit 118 is also referred to as a battery switch.

The battery unit 116 comprises a first battery 122 and a second battery 123. For example, the batteries 122, 123 are each a 12 V, 225 Ah, 1150 A battery, as typically used in vehicles. In the fault-free state of the battery unit 116, a series circuit of the batteries 122, 123 is used to supply the at least one electrical load 104, 108 with electrical power. This is also referred to as the normal state. In a faulty state of the battery unit 116, for example in the event of a failure of one of the two batteries 122, 123 or a short-circuit in the area of one of the two batteries 122, 123, only one of the two batteries 122, 123 is used to supply the at least one electrical load 104, 108 with electrical power. In this case, the supply voltage provided to the at least one electrical load 104, 108 corresponds to the battery voltage that can be provided by the remaining one of the two batteries 122, 123.

The generator 114 is mechanically coupled to the engine 106; for example, a generator shaft of the generator 114 is connected via a V-belt to an engine shaft of the engine 106. When the engine 106 is in operation, kinetic energy provided by the engine 106 can be converted in this way into electrical energy by the generator 114. The electrical energy provided by the generator 114 can be fed into the battery unit 116 so that the batteries 122, 123 can be charged. According to one exemplary embodiment, an operation of the generator 114 is regulated by using a charging regulator 124. The charging regulator 124 is also referred to as a voltage regulator.

The fault detecting unit 120 is configured to detect a faulty state of the battery unit 116 and to provide a fault signal 126 indicating the faulty state. For this purpose, the fault detecting unit 120 is coupled in a suitable manner to the battery unit 116. For example, the fault detecting unit 120 is configured to detect a short-circuit within the battery unit 116, or an output voltage of at least one of the batteries 122, 123 below a specification, as the faulty state.

According to one exemplary embodiment, the fault signal 126 is used to change the switching unit 118 over between the normal state and the emergency state.

The switching unit 118 has a first battery interface 130, a second battery interface 132, a third battery interface 134, a fourth battery interface 136, the first load interface 110 and the second load interface 112. The first battery interface 130 is connected to a first pole of the first battery 122, the second battery interface 132 is connected to a second pole of the first battery 122, the third battery interface 134 is connected to a first pole of the second battery 123 and the fourth battery interface 136 is connected to a second pole of the second battery 123.

The switching unit 118 optionally has a potential terminal 138 for providing a reference potential for the charging regulator 124, and a generator terminal 140.

In the normal state, switches of the switching unit 118 are switched such that the second battery interface 132 is connected to the third battery interface 134 so that the batteries 122, 123 are connected in series. In addition, the first battery interface 130 is connected to the first load interface 110 and the fourth battery interface 136 is connected to the second load interface 112. In this manner, a circuit across the first load interface 110, the series connection of the batteries 122, 123 and the second load interface 112 can be closed via the electrical load 104. In this case there is no direct connection between the second battery interface 132 and the load interfaces 110, 112 nor between the third battery interface 134 and the load interfaces 110, 112.

The switching unit 118 is configured to open the series circuit of the batteries 122, 123 in the emergency state. For this purpose, the switches of the switching unit 118 are switched such that the second battery interface 132 is disconnected from the third battery interface 134. If the fault signal 126 indicates a faulty state of the first battery 122, the first battery interface 130 and the second battery interface 132, and thus the first battery 122, are disconnected from the load interfaces 110, 112. The switching unit 118 is instead configured to connect the third battery interface 134 to the first load interface 110 and to connect the fourth battery interface 136 to the second load interface 112. In this manner, a circuit across the first load interface 110, the first battery 122 and the second load interface 112 can be closed via the electrical load 104. If the fault signal 126 indicates a faulty state of the second battery 123, the third battery interface 134 and the fourth battery interface 136, and thus the second battery 123, are disconnected from the load interfaces 110, 112. The switching unit 118 is instead configured to connect the first battery interface 130 to the first load interface 110 and to connect the second battery interface 132 to the second load interface 112. In this manner, a circuit across the first load interface 110, the second battery 123 and the second load interface 112 can be closed via the electrical load 104.

According to one exemplary embodiment, the charging regulator 124 is configured to regulate the operation of the generator 114 by using a control signal 150. For example, the generator 114 is configured to generate a charging signal 152 for charging the battery unit 116 and to adapt a characteristic of the charging signal 152 by using the control signal 150. The charging signal 152, for example, represents an electrical voltage or an electric current. The charging regulator 124 is configured according to one exemplary embodiment to generate and provide the control signal 150 by using the reference potential provided at the potential terminal 138.

According to one exemplary embodiment, the switching unit 118 is configured to connect the potential terminal 138 for generating the reference potential fixedly or switchably to the second battery interface 132 and/or the fourth battery interface 136.

The generator 114 is configured to charge the two batteries 122, 123 at a rated voltage of 24 V in the fault-free state and to change the charging voltage to 12 V in the event of a faulty battery 122, 123. For this purpose, the circuitry is adapted by changing the reference potential and then connecting the charging line 140 either to the first battery interface 130 or to the third battery interface 134.

The switching unit 118 is optionally configured to provide a switch-off signal 154 in the emergency state for switching off at least one load 104, 108 that is not suitable for operation at the lower emergency voltage.

The at least one electrical load 104 is optionally connected via a fuse unit 160, an interposed fuse box in the present case, to the load interfaces 110, 112.

According to this exemplary embodiment, the generator 114 is connected via an electrical line to the generator terminal 140 and optionally to the starter 108. The at least one electrical load 104 is connected via an electrical line and optionally a fuse unit 160, an interposed fuse box in the present case, to the first load interface 110. According to this exemplary embodiment, two electrical lines are shown, for example for connecting two separate electrical loads 104 to the switching unit 118. According to the exemplary embodiment shown, a second load terminal of the second load interface 112 is connected via an electrical line to the starter 108 and the engine 106. For this purpose, for example, the ground connection of the generator 114 is connected to the engine 106. Furthermore, two additional load terminals of the second load interface 112 are connected to the at least one electrical load 104 via two electrical lines via the optional fuse unit 160.

According to one exemplary embodiment, the vehicle 100 has a redundant vehicle electrical system by a degraded voltage. Creating redundancies is necessary or at least makes sense for example in the course of automated or autonomous driving of vehicles of all types. These redundancies must be configured such that the vehicle 100 cannot enter a safety-critical or uncontrollable state. There is therefore a transition to positioning systems such as the electrical braking system EBS or ABS (antilock braking system), which are indicated by the at least one electrical load 104 by way of example, at multiple points in the vehicle 100. So that this does not become a linked failure in case of a single fault, the power supplies of the control devices, such as the at least one electrical load 104, are configured to be sufficiently independent. According to the described approach, it is advantageously not necessary for this purpose to plan for an additional battery or, in the case of an E-truck as the vehicle 100, to generate the voltage from different cells by a DC/DC converter.

Instead, the situation that in some vehicles, particularly trucks, the vehicle electrical system voltage is operated by two 12 V batteries connected in series is utilized. By using the switching unit 118, which can be considered a special battery switch, one of the batteries 122, 123 can be isolated from the vehicle electrical system in the event of a fault, but the vehicle electrical system can continue to be available at a degraded half-voltage.

The reference potential is dependent on the state of the batteries. In the fault-free state, the reference potential is that of the fourth battery interface 136, and in the case of a faulty battery 122. If battery 123 is faulty, the second battery interface 132 is the reference.

The availability of the vehicle electrical system can be increased by the described approach so long as the control devices, like the at least one electrical load 104, are still capable of supplying sensors and actuators in this "under-voltage situation".

Figure 2:
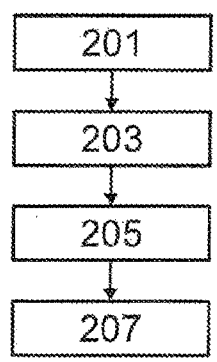
FIG. 2 shows a sequence diagram of a method for supplying at least one electrical load according to another exemplary embodiment.

FIG. 2 shows a sequence diagram of a method for supplying at least one electrical load according to one exemplary embodiment. The method can be used, for example, in conjunction with the device described with reference to FIG. 1.

In response to or during a fault-free state of the battery unit, the second pole of the first battery is disconnected from the load interface to the electrical load in a step 201, and in a step 203, the second pole of the first battery is connected to the first pole of the second battery and the second pole of the second battery is connected to the load interface.

In response to or during a faulty state of the second battery, the second pole of the first battery is disconnected from the first pole of the second battery in a step 205, and in a step 207, the second pole of the first battery is connected to the load interface. In response to or during a faulty state of the first battery, the second pole of the first battery is likewise disconnected from the first pole of the second battery in step 205, but in step 207, the first pole of the second battery is connected to the load interface.

When the faulty state has been rectified, steps 201, 203 can again be carried out.

THE LIST OF REFERENCE SIGNS IS AS FOLLOWS

- 100 Vehicle
- 102 Device
- 104 Electrical load
- 106 Engine
- 108 Starter
- 110 First load interface
- 112 Second load interface
- 114 Generator
- 116 Battery unit
- 118 Switching unit
- 120 Fault detecting unit
- 122 First battery
- 123 Second battery
- 124 Charging regulator
- 126 Fault signal
- 130 First battery interface
- 132 Second battery interface
- 134 Third battery interface
- 136 Fourth battery interface
- 138 Potential terminal
- 140 Generator terminal
- 150 Control signal
- 152 Charging signal
- 154 Switch-off signal
- 160 Fuse box
- 201 Disconnecting step
- 203 Connecting step
- 205 Disconnecting step
- 207 Connecting step

The invention claimed is:

1. A device for supplying power for a vehicle, comprising:
a battery unit, including a first battery and a second battery;
a fault detecting unit, for use with the first battery and the second battery, to detect a faulty state of at least one of the batteries and to provide a fault signal indicating the faulty state; and
a switching unit having a first battery interface, a second battery interface, a third battery interface, a fourth battery interface and a load interface for connecting at least one electrical load to the device;
wherein the fault detecting unit is coupled to the battery unit and to the switching unit,
wherein the first battery interface is connected to a first pole of the first battery, the second battery interface is connected to a second pole of the first battery, the third battery interface is connected to a first pole of the second battery and the fourth battery interface is connected to a second pole of the second battery,
wherein the switching unit is configured to disconnect the second battery interface from the load interface, to connect the second battery interface to the third battery interface and to connect the fourth battery interface to the load interface in a normal state,
wherein the switching unit is configured to disconnect the second battery interface from the third battery interface in an emergency state and, depending on the fault signal, either to connect the second battery interface to the load interface or to connect the fourth battery interface to the load interface, and
wherein the switching unit is configured to assume the emergency state if the fault signal indicates the faulty state.

2. The device of claim 1, wherein the switching unit is configured to connect the second battery interface to the load interface in the emergency state and to disconnect the fourth battery interface from the load interface if the fault signal indicates a faulty state of the second battery, and if the fault signal indicates a faulty state of the first battery, to connect the fourth battery interface to the load interface and to disconnect the second battery interface from the load interface.

3. The device of claim 1, wherein the first battery and the second battery have a same rated voltage.

4. The device of claim 1, further comprising:
at least one generator to adapt its charging voltage in the emergency state to that of a 12 V battery and to charge only a fault-free one of the batteries.

5. A vehicle, comprising:
a device for supplying power for a vehicle, including:
a battery unit, including a first battery and a second battery;
a fault detecting unit, for use with the first battery and the second battery, to detect a faulty state of at least one of the batteries and to provide a fault signal indicating the faulty state; and
a switching unit having a first battery interface, a second battery interface, a third battery interface, a fourth battery interface and a load interface for connecting at least one electrical load to the device,
wherein the fault detecting unit is coupled to the battery unit and to the switching unit,
wherein the first battery interface is connected to a first pole of the first battery, the second battery interface is connected to a second pole of the first battery, the third battery interface is connected to a first pole of the second battery and the fourth battery interface is connected to a second pole of the second battery,
wherein the switching unit is configured to disconnect the second battery interface from the load interface, to connect the second battery interface to the third battery interface and to connect the fourth battery interface to the load interface in a normal state,
wherein the switching unit is configured to disconnect the second battery interface from the third battery interface in an emergency state and, depending on the fault signal, either to connect the second battery interface to the load interface or to connect the fourth battery interface to the load interface, and
wherein the switching unit is configured to assume the emergency state if the fault signal indicates the faulty state; and
at least one electrical load, which is connected to the load interface of the device.

6. The vehicle of claim 5, wherein the electrical load is configured as a control device for a safety-critical electrical load of the vehicle.

7. The vehicle of claim 5, further comprising:
an engine that is mechanically coupled to a generator of the device.

8. A method for supplying at least one electrical load of a vehicle with electrical power, the method comprising:
detecting, via a fault detecting unit, a faulty state of at least one of a first battery and a second battery, and providing a fault signal indicating the faulty state, wherein the first battery and the second battery are included in a battery unit;
disconnecting a second pole of the first battery from a load interface to the electrical load and connecting the second pole of the first battery to a first pole of the second battery and connecting a second pole of the second battery to the load interface in response to a fault-free state of the first battery and the second battery; and
disconnecting the second pole of the first battery from the first pole of the second battery and connecting the second pole of the first battery to the load interface in response to a faulty state of the second battery, or connecting the second pole of the second battery to the load interface in response to a faulty state of the first battery;
wherein the fault detecting unit is for use with the first battery and the second battery,
wherein the fault detecting unit is coupled to the battery unit and to the switching unit interface, and
wherein the switching unit is configured to assume the emergency state if the fault signal indicates the faulty state.

* * * * *